April 20, 1943.   E. O. WOODWARD   2,316,928
INDUCTIVE REACTOR
Filed Aug. 18, 1939

INVENTOR.
Edward O. Woodward

Patented Apr. 20, 1943

2,316,928

UNITED STATES PATENT OFFICE 2,316,928

INDUCTIVE REACTOR

Edward O. Woodward, Hollywood, Calif.

Application August 18, 1939, Serial No. 290,815

2 Claims. (Cl. 171—242)

This invention relates to improvements in inductive reactors employed in electrical circuits; to a new and useful core arrangement for said reactors; and to methods and means for making an improved reactor and for adjusting the value of same. While the invention is here described in reference to the use of the improved devices in communication circuits, in particular with reference to reactors commonly known as "inductances" and "audio frequency chokes," it is to be understood that the invention is not limited to such use, and that the novel features here disclosed may be applied to other fields of electrical engineering, and to transformers and other inductive elements.

This invention relates to novel forms of core structure or arrangement of the parts thereof, and to, in certain circumstances, novel placements and arrangements of the winding or windings of the reactor with respect to elements or portions of the core structure. The invention is not applicable to the type of reactor known as an "air-core coil," but may be applied to reactors, inductances, transformers, chokes etc. having a core structure; such as, for example, devices having dust cores, iron cores, alloy cores (such as "electric metal, hypernik, permalloy" etc.) and, in high-frequency use, cores of materials commonly known as dielectrics. The invention is here described in relation to communication inductances, having a laminated core structure, but it is to be understood that this description and the accompanying illustrations are by way of example and are not limitative of the scope of the invention.

In the design and construction of reactors of the type described, it has been found that optimum efficiency is secured by the employment of an air-gap or gaps in the path of the magnetic flux of the reactor, and that the thickness or width of the gap or gaps is independent of the inductance value of the reactor but is determined by the frequency at which the device is intended to be operated, the mechanical design of the unit, the characteristics of the magnetic materials employed, etc. This gap, usually in air, may be filled by a dielectric; and it constitutes a separation of or gap in the magnetic circuit, which should not be confused with the structure obtained by the use of insulated laminations. According to this invention, therefore, it is possible to adjust the value of inductance of a reactor by a change in the length of the magnetic flux path without making a change in the air gap which has been established at a definite value by the factors above discussed independently of the inductance value.

In the construction of an inductance having a specified value, the method in use prior to my invention was to build a choke with a magnetic path which was almost closed, and which had an air-gap of particular dimensions in the said path, the purpose of this air-gap being to hold the total loss to a minimum at a desired frequency. This airgap is then varied to effect the adjustment of the value of the completed unit to its specified amount: and, where the airgap is small, the dimensions of the gap are extremely critical, and a small change in gap may result in a large change in inductance value. Thus devices constructed in this manner are difficult to adjust, and also are subject to changes in value which may be occasioned by physical changes in the airgap length due to, for example, rearrangement of elements due to mechanical shock, or to alternate expansion and contraction of elements due to heating, and to other causes.

Also, due to variations found in the permeability of commercial forms of laminations, an adjustment of this type is necessary in the production of all inductances or chokes of a reasonably high order of accuracy, so that the adjustment of the airgap forms an essential part of the production of such devices on a commercial scale.

And, due to the flux distribution pattern produced by the single airgap, and its effect of a lumped loading on the magnetic circuit, it is not possible to provide identical coils on opposite legs which will have identical inductance values; thus an arrangement of parallel tapped coils is unsatisfactory; and also when coils are interconnected it is found that the theoretical relationship does not exist in practice, and that the inductance value does not vary exactly as the square of the turn ratio of the coils.

In contradistinction to the above method, this invention contemplates the design of an inductance, choke, reactor or other element for a predetermined fixed airgap (the value of which must depend on the operating frequency) and securing the adjustment of inductance value by varying the length of the flux path in the core material while keeping the airgap distance at a fixed value. Since the inductance varies inversely as the sum of the two nearly equal reluctances of the flux path and each reluctance is proportional to its length, although these lengths are not of the same order of magnitude, small corrections in inductance are more easily obtained by a variation of the iron path reluctance through change of iron path length than by variation of air-gap reluctance through change of air-gap length. And it is clear that the improved method of construction is independent of the core material or of the type of core employed (for example, the core may be built up of U laminations, it may be of the shell type, etc.). This method of adjustment also varies the effective cross sectional area of the air gap. The flux density across the gap is lower than in the core.

In a preferred form of this invention, the windings or coils may be placed over the air gaps, and since the said gaps extend for the full length of the coils, the inductance value of each separate turn of each winding is the same as that of any other turn, and therefore windings may be connected in parallel or in series, and tapped, in strict conformity with the theoretical considerations.

This construction possesses a further advantage in that due to the enclosure of the air gap or gaps within the field of the winding or windings and substantially within the physical limits of the coil or coils, the stray flux is held to a minimum, and also the susceptibility of the device to external fields is also reduced to a minimum, as it presents virtually a closed core construction to external influence. And yet another advantage resides in the distribution of the flux-bearing material in the space within the windings or coils. Due to the distributed nature of the air gap and core material, it is possible according to this invention to construct an inductance having a laminated core whose characteristics approach those of a device having a dust core.

An object of this invention is the provision of an improved reactor, inductance, or choke substantially as described; and of a method of making such a device. Another object of the invention is the arrangement of the core elements of a reactor, inductance, or choke to provide a device having the novel features described, and the advantages herein disclosed.

A further object of the invention resides in an improved inductance or choke, and the design and manufacture thereof, the inductance value of which device may be readily adjusted, or easily changed, and one in which such change may be made directly proportional to the mechanical displacements of component parts thereof.

Another object of this invention is the provision of an inductance or choke comprising a plurality of sections in which the inductance values of the various sections are related to each other as a function of the turns of each section; and in which a change in the inductance value of one winding is accompanied by a corresponding change in the inductance value of another winding.

A further object of the invention is the provision of a reactor, inductance or choke having a laminated core, the characteristics of the device however approaching one having a dust or other distributed core. Another object is to provide a construction such that a variable inductance value may be secured by relative movements of the component parts, and one in which such a physical displacement is proportional to a first-order change in inductance value. Other objects of the invention will be apparent in the following specification and appended drawing in which a preferred form of the invention is disclosed by way of example only. In this drawing:

Figure 1:
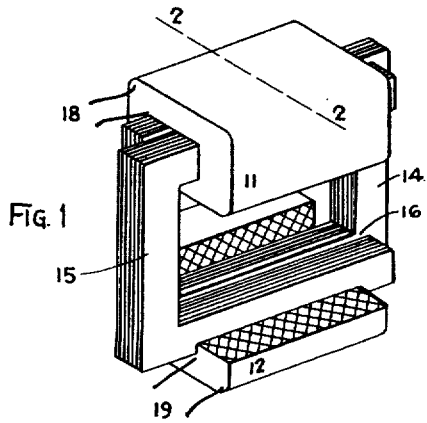
Figure 1 shows in perspective, and partly in section, a preferred embodiment of the invention.
Figure 2:
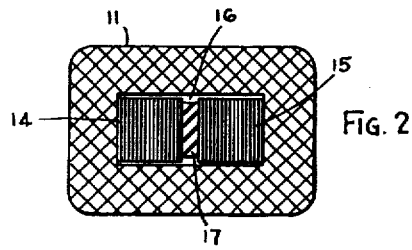
Figure 2 is a cross-section on the line 2—2 of Figure 1.
Figure 3:
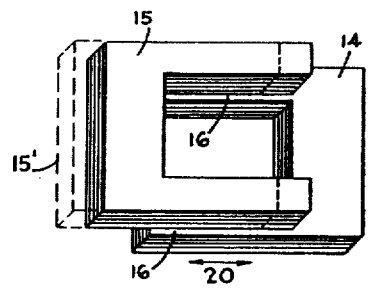
Figure 3 shows one form of core arrangement and adjustment according to this invention.

The form of the invention shown in Figures 1 to 3 constitutes a preferred embodiment, and is the form most usually employed in practice. As shown, U shaped members are used, which may be laminations of any desired material, such as iron, permalloy, hypernik, etc., or may comprise pressings of magnetic dust with a suitable binder. In this arrangement, all the laminations forming one end of the core may be arranged in one group and substantially in one plane, while those forming the other end may be in another group in another plane, for convenience parallel to the first group, the perpendicular space between the said planes or groups in the overlapping parts of the structure comprising the air gap or gaps.

The procedure in assembling or stacking a choke of U laminations according to this invention may be as follows. One half of the stack of laminations is inserted in the coils from say the left hand side. Then a non-magnetic substance of the thickness of the required air gaps is placed in position in the coils; this substance may be Bakelite, wood, etc., as may be found convenient, as, if the separation material employed is a non-conductor, the Q of the device is substantially unaffected thereby except at extremely high frequencies.

Then the remaining laminations may be inserted from the right-hand end, and may be moved in or out of the coils without affecting the width of the air gaps to increase or decrease the length of the magnetic path and thus adjust the inductance value to the predetermined amount. This adjustment also varies the cross-sectional effective area of the air gap, and the flux density across the said gap. By suitable design, the effects of this secondary variation may be made negligible, or of a desired amount.

In Figure 1, coils 11 and 12 are shown mounted on a U structure according to this invention. The laminations are in two groups, as above described, 14 and 15. In the drawing the lower coil 12 is cut away so as to show the air gap 16 between the legs of the groups 14 and 15. The figure illustrates an arrangement of the coils or windings 11 and 12 in which the air gap and coils are of roughly the same length (with allowance for adjustment of flux path) and in which the coils are wholly over the air gaps. The leads for the coil 11 are shown at 18, and for the coil 12 at 19. The arrangement shown in the figure then allows these coils to be connected in series or parallel; or, if tapped, the various sections to be so connected, with a resulting inductance value which is proportional to the coil constants.

In Figure 2 a cross-section through the coil 11 is shown, with the location of the groups of laminations 14 and 15. The air gap 16, between the legs 14 and 15, is shown in this figure, together with an insulating spacer 17, which may be of Bakelite or other suitable material, as above described. The purpose of the spacer 17 is to secure and maintain the correct gap 16, and to produce a rigid structure from the assembly of the coils and laminations, and one which may be handled without change of inductance value.

In Figure 3 the core members, which may consist of U laminations as shown, are illustrated at 14 and 15; and at 15' is shown a position for the member 15 which gives a different inductance value to the unit. The double arrow 20 shows the direction of movement of the members 14 and 15 in securing the adjustment desired. The air gaps are shown at 16, and it is to be noted that these gaps are not essentially of the same size. If only one coil is used on a device of the class described, it may be advantageous to the completed unit to dispense with one of the gaps, and to place the core members in actual contact; or it may be desired to have a different gap distance on one side to that on the other. These factors may be elements considered in the design of the unit, and it is to be understood that all such variations are within the scope of this invention. Thus the core shown in Figure 3 may be provided with one or two air gaps, and with one or a plurality of windings, as desired.

Figure 4:
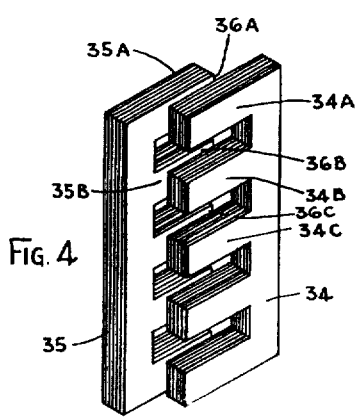
Figure 4 shows a core arrangement in a plurality of sections.

An arrangement of laminations having a plurality of overlapping sections is shown in Figure 4, where the two stacks 34 and 35 are shown. The leg 35A of the stack 35 is separated from the leg 34A of the stack 34 by the gap 36A, and the leg 35B from the leg 34B by the gap 36B, etc. It is clear that these gaps may be of any suitable dimension, and that the gaps need not be of the same thickness. On an assembly as shown in this figure, any member of suitable coils may be arranged to produce a desired result.

Figure 6:
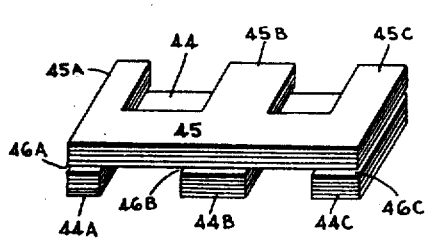
Figure 6 shows a core arrangement with unequal flux density distribution.
Figure 7:
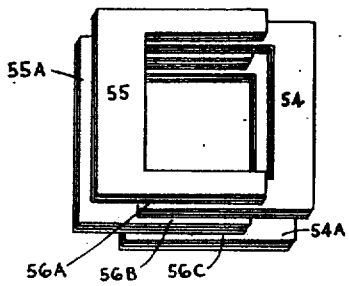
Figure 7 shows an arrangement of elements according to this invention employing a plurality of core groups.

Figure 6 shows a somewhat similar arrangement to that shown in Figure 4, except that the legs 45A, 45B and 45C of the stack 45 of E laminations (and similarly 44A, 44B, and 44C of the stack 44) are of different sizes. Thus by control of the individual lamination size and the individual gap 46A, 46B and 46C, any desired flux distribution pattern may be achieved in order to produce a desired result. And in Figure 7 is illustrated a construction in which the number of stacks has been increased over the two previously described: The left-hand group is divided into two, 55 and 55A, and the right-hand group similarly into 54 and 54A. On each side therefore there are three gaps, 56A, 56B, and 56C: These gaps may be of any suitable spacing, equal or unequal to one another, or one or more of the gaps may be eliminated. It is also clear that this type of construction is not limited to the four stacks shown: three or more stacks may be satisfactorily employed in this embodiment; and further, adjustment in this case may be secured by movement of one or more stacks or groups. This arrangement of multiple gaps within the coil or coils also has a further advantage in that it increases the effective magnetic separation and produces, in the ultimate, a result comparable to that achieved with a core comprising magnetic particles in an insulating body, as for example in a dust core. This effect is more pronounced in the arrangement shown in Figure 7 than in that shown in Figure 3, in proportion to the increase in the number of air gaps.

Figure 5:
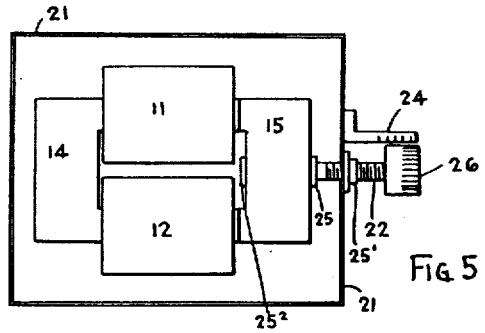
Figure 5 is a plan view of the device of Figure 1 arranged in a case as an adjustable inductance.

Figure 5 shows a device constructed according to Figures 1, 2, and 3, in which the assembled unit is arranged in an enclosure, which may be a box, shielded or unshielded as desired, and adapted to provide an inductance or reactor having a continuously variable or adjustable inductance value. The stacks 14 and 15 and the coils 11 and 12 are disposed in the case 21, and in a manner not shown the coils 11 and 12 and the stack 14 are attached to the case. The stack 15 is movable in and out of the coils 11 and 12, being guided in its movement, for example, by the sides of the coil form and the separator 17, which, in this embodiment, may be made of suitable material, suitably lubricated if desired (as, for example, by a graphite layer) and so spaced as to allow the requisite movement.

In the figure a threaded shaft 22 is shown, engaging a threaded member 25' which is fastened to one face of the case 21. The stack 15 may be provided with a hole to receive the end of the shaft 22, which may be suitably located by members 25 and $25^2$ so that the shaft 22 is free to rotate and yet will cause the stack 15 to move in and out of the coils 11 and 12 under the influence of the nut 25'. The shaft 22 may be provided with a head 26, which may have graduations thereon, and there may also be provided a graduated index 24 which serves in a well known manner to provide a scalar reading of the relative position of the stack 15. If desired, this member 24 and the associated head 26 may be graduated in units of inductance value, so that a direct reading of the value for any setting may be made.

This particular construction is here illustrated by way of example only; it is clear that there are a number of means which may be employed to secure the physical displacement of the members with respect to each other. Also, there are numerous means available for securing a graduation reading of this movement, and the invention is not limited to the particular form illustrated. Furthermore, this movement and/or graduation may be combined with other movements or apparatus: For example, control of the movement of the stack 15 may be effected by a solenoid, through appropriate linkage if desired; or it may be effected in conjunction with a control of capacity, as for example in an oscillator or filter or timing network. Other such modifications will be apparent to those skilled in the art, and it is to be understood that the invention is not limited to the form here illustrated by way of example.

Where in the appended claims reference is made to a reactor, it is to be understood that the device referred to is such as may be used in the communication, power transmission and distribution fields, and all other applications of a device having inductive reactance. And where reference is made to the core of a reactor of this type, it is to be understood that, in addition to the conventional type illustrated which may be of laminated iron, any suitable material having the desired characteristics at the frequency employed may be used; for example at very high frequencies devices may be constructed according to this invention in which the core material is only slightly magnetic. Also, while a core type structure has been illustrated, it is to be understood that the invention may be adapted to other types, for example, to a shell type structure, within the scope of the disclosure and claims. And where in the claims reference is made to overlapping members, it is to be understood that the structure is not limited to that illustrated by way of example in the drawing, but comprises all forms of overlap which may be employed in the manner disclosed and that no limitation to shape or material is implied. And where reference is made to a constant air gap, it is to be understood that a gap of substantially constant thickness in the direction of the path of magnetic flux is intended; and that where reference is made to lumped or distributed air gaps such terminology does not include the fortuitous spacing of laminations between one another, but that the gap or gaps considered are of definite design dimensions.

Having now described my invention, I claim:

1. As an article of manufacture an inductive reactor having a winding and a magnetic flux path through magnetic and non-magnetic members, said winding being so disposed with respect to the other members that each turn of the winding is over a substantially identical section of magnetic and non-magnetic material so that each turn has an identical reactance value regardless of its position.

2. A communication reactor comprising a laminated core in a plurality of overlapping sections separated from each other by relatively non-magnetic material and one or more windings so disposed on the core that the magnetic gaps so formed are uniformly distributed throughout the space occupied by the windings.

EDWARD O. WOODWARD.